United States Patent [19]
Nanba

[11] 4,077,043
[45] Feb. 28, 1978

[54] EXPOSURE INDICATING DEVICE
[75] Inventor: Yasuhiro Nanba, Osaka, Japan
[73] Assignee: Minolta Camera Kabushiki Kaisha, Osaka, Japan
[21] Appl. No.: 709,528
[22] Filed: Jul. 28, 1976
[30] Foreign Application Priority Data
  Aug. 2, 1975   Japan ................................. 50-94524
[51] Int. Cl.$^2$ ...................... G03B 7/08; G03B 17/18
[52] U.S. Cl. ..................................... 354/51; 354/60 L
[58] Field of Search .................. 354/50, 51, 53, 54, 354/55, 56, 57, 60 L

[56] References Cited
U.S. PATENT DOCUMENTS

| 3,581,643 | 6/1971 | Yoshimura | 354/60 L X |
| 3,936,842 | 2/1976 | Nanba et al. | 354/51 X |
| 3,987,464 | 10/1976 | Kitai et al. | 354/60 L X |

Primary Examiner—L. T. Hix
Assistant Examiner—M. L. Gellner
Attorney, Agent, or Firm—Wenderoth, Lind & Ponack

[57] ABSTRACT

An exposure indicating device for use in a photographic camera which includes a light measuring circuit for generating an output representative of scene brightness, a reference voltage circuit for producing reference voltage, a first switching circuit and a second switching circuit receiving the outputs of the light measuring and reference voltage circuits, and indicating means responsive to outputs of the first and second switching circuits. The indicating device indicates that automatically controlled exposure factor, i.e., shutter speed or diaphragm aperture, will be higher or lower with respect to more than one standards, without any change-over of switches. For example, this device indicates that shutter speed to be effected automatically will be in any of blur occurring range, available range and upper outside range.

22 Claims, 5 Drawing Figures

EXPOSURE INDICATING DEVICE

BACKGROUND OF THE INVENTION

The present invention relates to a photographic camera and more particularly, to an exposure indicating device for use in a camera whose shutter speed is automatically controlled in response to the brightness of the object to be photographed or the scene brightness, which exposure indicating device informs the photographer that shutter speed to be effected automatically will be inside or outside of the available range.

In the cameras of the above described type, the shutter speeds are automatically controlled by means of exposure factors such as the brightness of the object to be photographed or the scene brightness, sensitivity of the film and the diaphragm aperture value or $f$ number. Since the film sensitivity is determined by the film employed and the diaphragm aperture value is preselected by the photographer, the brightness of the object to be photographed is the main factor affecting the shutter speeds in acutal photography. In general such shutter speeds to be effected automatically may be broadly divided into three ranges, i.e., blur occurring range, e.g., the range of shutter speeds below a certain value, for example, one-thirtieth second, which will bring about blur in a picture taken with the camera supported by hand; upper or higher outside range which requires a high shutter speed not provided in the camera so that it is impossible to use in the camera; and an available range between the blur occurring and higher outside range. At such blur occurring shutter speed, either the use of camera stabilizing means such as a tripod is required or the employment of film having higher sensitivity or the adjustment of the $f$ number is necessary, while at the upper outside shutter speed, a similar selection in the film sensitivity or the $f$ number is required to bring the shutter speed to be effected automatically within the available range suitable for optimum exposure. To inform the photographer of such shutter speeds, an exposure indicating device for indicating any of the ranges into which the shutter speed fits is generally incorporated in the camera of the above described type.

In the conventional exposure indicating devices, for example, those disclosed in U.S. Pat. Nos. 3,712,194 and 3,742,827, it is so arranged that part of the depression stroke of a shutter release button of the camera is utilized for changing-over operational switches of a light measuring circuit in a manner as described hereinbelow.

Referring to FIG. 1 showing one example of known exposure indicating arrangements, the circuit generally comprises: a light measuring circuit which includes a photoelectric element as CdS cell Rp selectively connected in series to resistors R1 or R2 or the parallel connection of capacitor C1 and a switch S2 through a change-over switch S3 for generating, at a junction P1, an output representative of the brightness of the object to be photographed or the scene brightness when the photoelectric element Rp is connected to the resistor R1 or R2 and for forming a time constant circuit when the element Rp is connected to the capacitor C1; a reference voltage circuit including series-connected resistors R3 and R4 for generating reference voltage output at a junction P2; a switching circuit or differential amplifier A1 connected, at its input, to the output junctions P1 and P2 of the light measuring circuit and the reference voltage circuit; an indicating lamp L1 connected to the output of the differential amplifier A1 at the junction P3 and another indicating lamp L2 also connected to the output of the amplifier A1 through an inverting transistor Q1, the lamps L1 and L2 being further connected to the positive side of the power source E through a change-over switch S3'. The capacitor C1 forms a time constant circuit with the photoelectric element Rp for controlling an electromagnet Mg connected to the output of the amplifier A1 at the junction P3, which electromagnet Mg controls closing of the shutter (not shown) of the camera. The switch S2 is adapted to be opened in association with the opening of the shutter, while the switches S3 and S3' are actuated for changing-over of the indications in association with the depressing of the shutter release button.

In the above described conventional circuit arrangement, the movable switch contacts S3$m$ and S3'$m$ of the switches S3 and S3' are initially kept in contact with the respective stationary contacts S3$a$ and S3'$a$, and upon depression of the shutter release button, the main switch S1 is closed, with the lamp L1 being connected to the power source E. At this stage, since the switch S3 is connected at the contact S3$a$, the potential at the junction P1 of the photoelectric element Rp and the resistor R1 is compared with the potential at the junction P2 of the resistors R3 and R4. The value of the resistor R1 is so determined that when scene brightness is so low as to provide shutter speed in the blur occurring range, the potential at the point P1 is lower than the potential at the point P2 of the reference voltage circuit thus generating an output from the differential amplifier A1 to energize the amp L1 for warning. Further depression of the shutter release button causes the movable contacts S3$m$ and S3'$m$ of the switches S3 and S3' to be switched over to the stationary contacts S3$b$ and S3'$b$ respectively, in which case, the potential at the point P1 is equal to the potential of the power source E divided by the photoelectric element Rp and the resistor R2. The resistor R2 has a resistance value such that the potential at the point P1 generated by series connection of photoelectric element Rp and the resistor R2 is higher than that at the point P2 when scene brightness is so high that the camera effect the shutter speed suitable for the brightness. Accordingly, when the scene brightness is a value to effect shutter speed in the available range, the potential at the point P1 is lower than that at the point P2 of the reference voltage circuit to produce output from the differential amplifier A1, but the lamp L1 is not lit since the movable contact S3'$m$ of the switch S3' is connected to the stationary contact S3'$b$, while the lamp L2 is not energized either, through inversion of the output from the amplifier A1 by the transistor Q1. When the scene brightness is over the critical value which provides or effects the highest shutter speed available in the camera, no output is produced from the differential amplifier A1, since the potential at the point P1 exceeds that at the point P2. The transistor Q1 is supplied with base current through the electromagnet Mg and the resistor R5 to be rendered conducting, thus the lamp L2 is energized to warn that a shutter speed over the highest available is required.

The prior art exposure indicating device as described above, however, has various disadvantages in that the arrangement requires change-over switches for selectively conducting resistors, capacitor and lamps, and a mechanism for associating the shutter release button with the switches, and also in that the stroke for the depression of the shutter release button tends to be long, thus being unsuitable for incorporation into small sized cameras. Furthermore, some skill is necessary in depressing the shutter release button for checking the exposure conditions, since the prior art device is so arranged as to check the blur occurring shutter speed at the initial stage of depression of the shutter release button, with subsequent checking for the higher shutter speed upon further depression of the shutter release button, and then fully depression of the shutter release button for actual opening of the shutter.

Referring to FIG. 2, there has also been conventionally proposed another exposure indicating arrangement wherein the change-over switches such as the switches S3 and S3' in the circuit of FIG. 1 are dispensed with, and parallel-connected resistors r1 and r2 are connected between the photoelectric element Rp and the earth, and collector-emitter circuit of a transistor Q0 is connected in series to the resistor r2, while a rectangular wave oscillator PG is connected to the base of the transistor Q0 for driving the same transistor Q0. The junction P between the photoelectric element RP and parallel-connected resistors r1 and r2 is connected to a switching circuit A for energizing the lamp L by the output from the circuit A. By the above arrangement, independent connection of the resistor r1 to the photoelectric element Rp and connection of the parallel-connected resistors r1 and r2 to the element Rp are alternately established. When the scene brightness is so low as to provide shutter speed in the blur occurring range the switching circuit A produces output therefrom in both of the above cases for continuously energizing the indicating lamp L connected to the output terminal of the switching circuit A, while when the shutter speed is in the available range an output is produced from the switching circuit A only when transistor Q0 is conducting and for producing output from the switching circuit A only when the resistors r1 and r2 are in parallel with the indicating lamp L being alternately energized and de-energized. When the scene brightness is over the critical value which provides or effects the highest shutter speed available to the camera, no output is produced from the switching circuit A even during conduction of the transistor Q0, with the lamp L remaining de-energized. Although it does not require any change-over switches, the known arrangement as described above also has a serious disadvantage in that the adoption of the rectangular wave oscillator is particularly required for inclusion, thus resulting in complication of the circuit construction, with consequent high cost.

SUMMARY OF THE INVENTION

Accordingly, an essential object of the present invention is to provide an exposure indicating device for use in a photographic camera which is capable of indicating whether exposure factor to be effected by automatic control means is higher or lower with respect to a plurality of standard levels, without employment of change-over switches associated with the shutter release button, rectangular wave oscillator and the like, and with substantial elimination of disadvantages inherent in the conventional exposure indicating devices.

Another importat object of the present invention is to provide an exposure indicating device of the above described type which is capable of indicating simultaneously and without employment of change-over switches, that the shutter speeds effected by an automatic control circuit are in which range of blur occurring, available and higher outside ranges.

A further object of the present invention is to provide an exposure indicating device of the above described type which is capable of indicating, simultaneously and without change-over switches, whether the shutter speeds effected by an automatic control circuit are so low as to exceed the lowest shutter speed free from blur occurrance and, at the same time, whether the shutter speeds effected by the automatic control circuit are so high as to exceed the highest shutter speed that can be effected by the camera.

A still further object of the present invention is to provide an exposure indicating device of the above described type in which a switching circuit for controlling closure of a shutter is also used for the above mentioned indication.

Another object of the present invention is to provide an exposure indicating device of the above described type in which two luminescent elements such as lamps, light emitting diodes, etc., are controlled for indicating of two standards.

A further object of the present invention is to provide an exposure indicating device of the above described type in which one liminescent element is controlled for indication of two standards, i.e., for indication that the shutter speeds effected by an automatic control circuit are in which of three ranges of blur occurring, available and higher outside ranges.

Another object of the present invention is to provide an expsoure indicating device of the above described type in which three luminescent elements are controlled for indication that the shutter speeds effected by an automatic control circuit are in which of the three ranges of blur occurring, available and higher outside ranges.

A further object of the present invention is to provide an exposure indicating device of the above described type which is simple in construction and compact in size and which can readily be incorporated into small sized cameras.

A still further object of the present invention is to provide an exposure indicating device of the above described type which is stable in function and easy to operate.

According to a preferred embodiment of the present invention, the exposure indicating device includes a light measuring circuit for generating output representative of the brightness of the object to be photographed, a reference voltage circuit for generating reference voltage as output, a first switching circuit receiving the outputs of the light measuring circuit and reference voltage circuit, which first switching circuit generates output when there is a difference between the outputs of the light measuring circuit and reference voltage circuit, a second switching circuit receiving the outputs of the light measuring and reference voltage circuits, an amplifying circuit operated by output of the second switching circuit, and indicating means responsive to outputs of the first and second switching circuits. Thus the indicating device indicates that the automatically controlled exposure factor, i.e., shutter speed or diaphragm aperture, will be higher or lower with respect to more than one standards without any change-over switches. For example, the exposure indicating device of the invention indicates that shutter speed to be effected automatically will be in any of blur occurring range, available range and upper outside range. Since the indicating means can be actuated by the two switching circuits, change-over switches and the like required in the conventional exposure indicating devices are eliminated, with consequent simple construction and compact size, by which arrangement, an exposure indicating device having stable functioning and pariticularly suited for incorporation into small sized cameras is advantageously presented.

BRIEF DESCRIPTION OF THE DRAWINGS

These and other objects and features of the present invention will become apparent from the following description taken in conjunction with the preferred embodiment thereof with reference to the attached drawings in which.

Before the description of the present invention proceeds, it is to be noted that like parts are designated by like reference numerals throughout several views of the attached drawings.

DETAILED DESCRIPTION OF THE PREFERRED EMBODIMENTS

Figure 3:
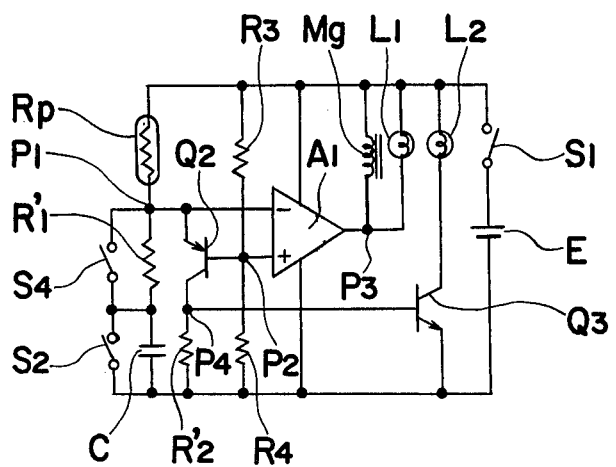

Referring now to FIG. 3, there is shown a circuit arrangement of an exposure indicating device according to one embodiment of the present invention, which includes a light measuring circuit having series-connected photoelectric element such as CdS cell Rp and resistor R1', which light measuring circuit is connected in series, through a main switch S1, with the power surce E, while a capacitor C which forms part of a time constant circuit with the photoelectric element Rp is further inserted between the resistor R1' and the negative side of the power source E, with switches S4 and S2 being connected in parallel with the resistor R1' and the capacitor C respectively.

It is to be noted here that the photoelectric element Rp may be arranged to output a signal representative of shutter speed suitable for the scene brightness measured by the element or for a combination of such scene brightness and set diaphragm aperture and/or set film sensitivity.

It should also be noted that before opening of the shutter (not shown), the switch S2 is closed with the switch S4 open, thus the capacitor C is removed from the light measuring circuit. The output point P1 of the light measuring circuit is connected to one input terminal of a switching circuit or differential amplifier A1 which is connected in parallel to the light measuring circuit. The amplifier A1 also serves as the switching circuit for shutter control, and is connected at the output side thereof to an electromagnet Mg for causing the shutter to close, and to a blur occurring shutter speed indication lamp L1 which are further coupled to the positive side of the power source E. The other input terminal of the amplifier A1 is connected to an output P2 of a reference voltage circuit including series-connected resistors R3 and R4 which are also connected in parallel with the light measuring circuit. The output P2 is further connected to the base of a transistor Q2 which is rendered conducting when the emitter potential thereof exceeds the potential at the output P2. The emitter of the transistor Q2 is connected to the output P1 of the light measuring circuit so as to be turned on when the potential at the point P1 becomes higher by a predetermined amount than the potential at the point P2, i.e., when the brightness of the object to be photographed exceeds a predetermined level for causing current to flow through a resistor R2' connected between the collector of the transistor Q2 and the emitter of a transistor Q3. The transistor Q3 is further connected at its emitter to the negative side of the power source E, while the junction P4 between the collector of the transistor Q2 and the resistor R2' is connected to the base of the transistor Q3. An indicating lamp L2 is inserted between the collector of the transistor Q3 and the positive side of the power source E as a load for indicating the upper outside shutter speed range.

In the above arrangement, while the shutter speeds of the camera are controlled, for example, from one to one-thousandth second in response to the scene brightness through the output from the time constant or timing circuit including the photoelectric element Rp and the capacitor C, the output of the timing circuit is coupled to the one input terminal of the differential amplifier A1, and the output of the reference voltage circuit including the resistors R3 and R4 is coupled to the other input of the amplifier A1.

Upon depression of the shutter release button, the switch S4 closes in association with movement of the mechanical shutter (not shown), and the switch S2 opens, thus the capacitor C is charged by the output of the photoelectric element Rp, in which case, the time required for the charge of the capacitor C is short if the output of the photoelectric element Rp is high. While the capacitor C is not sufficiently charged, the amplifier A1 stays "on", with the electromagnet Mg kept energized to hold the mechanical shutter open, and when the capacitor C is charged to a predetermined level, the amplifier A1 is turned "off" or inversed, with the electromagnet Mg de-energized for releasing the mechanical shutter to close the same shutter. Therefore, when the scene brightness is low, to result in the shutter speed being controlled to be, for example, slower than one thirtieth second whereat blur may occur due to movement of the camera if hand-held, the potential at the point P1, as an output of voltage divider consisting of the photoelectric element Rp and the resistor R'1 is consequently lower than the level of the reference voltage, thus an output is produced from the amplifier A1 to energize the lamp L1 for warning the possibility of blur occurring in the photograph taken. On the other hand, when the scene brightness is high and consequently the shutter speed to be controlled through the light measuring circuit will be, for example, faster than one-thousandth second which is the maximum shutter speed of the camera, the transistor Q2 is turned on to generate output for rendering the transistor Q3 conducting so as to energize the lamp L2 for indicating that suitable exposure for given brightness is not available to the camera and that actual shutter speed will be slower than the suitable one, thus resulting in over-exposure. In other words, the amplifier A1 is rendered conductive so long as the potential at the junction P1 does not reach the reference voltage at the junction P2, while the transistor Q2 becomes conductive when the potential at the junction P1 exceeds the reference voltage by more than a predetermined amount which depends on the characteristics of the transistor Q2. On the other hand, when the potential at the junction P1 exceeds the reference voltage but by less than the predetermined amount, both the amplifier A1 and the transistor Q2 are non-conductive.

More specifically, when the main switch S1 is turned on, the photoelectric element Rp and the resistor R'1 are connected in series to each other through the switch S2 which is closed, with the switch S4 kept open. If the potential at the point P1 between the photoelectric element Rp and the resistor R'1 is lower than the potential at the point P2 between the resistors R3 and R4, the amplifier A1 is turned on and the indicating lamp L1 is energized by the output from the amplifier A1. Meanwhile, in the device of the present invention, the transistor Q2, which is coupled to the indicating lamp 2 through the transistor Q3, is incorporated. Since the transistor Q2 is rendered conducting when the potential at the point P1 is higher than the potential at the point P2 with the difference therebetween exceeding a predetermined amount, the higher outside shutter speed whereat the scene brightness is over the critical value which provides the highest shutter speed available to the camera is also indicated by the indicating lamp 2.

Meanwhile, within the available shutter speed range for optimum exposure, the potential at the point P1 of the light measuring circuit is higher than that at the point P2, thus no output is produced from the amplifier A1, thus the indicating lamp L1 is not lit. The potential at the point P1 is not so much higher than that at the point P2 as to cause the transistor Q2 to be turned on and render the transistor Q3 conducting, thus the indicating lamp L2 remains de-energized.

If the photographer, after confirming the available shutter speed, depresses the shutter release button, the switch S4 is closed and the switch S2 is opened in association with shutter opening operation, and thus the capacitor C is connected to the photoelectric element Rp through switch S4, with the resistor R'1 being disconnected from the photoelectric element Rp, so that the shutter is controlled through the RC timing circuit including the photoelectric element Rp and the capacitor C, switching circuit A1 and electromagnet Mg, as described earlier.

On the contrary, when the brightness of the object to be photographed is such one as to require shutter speed to be out of the camera exposure capacity, the potential at the point P1 also rises, with consequent increase of the current flowing through the resistor R2' to such an extent as to render the transistor Q3 conducting at a certain level for energizing the lamp L2 to indicate such critical shutter speed range. In this case, the photographer should operate the shutter release button after setting the diaphragm to larger $f$ number, or exchanging film for the one of lower sensitivity or mounting an ND filter in front of camera objective.

Figure 4:
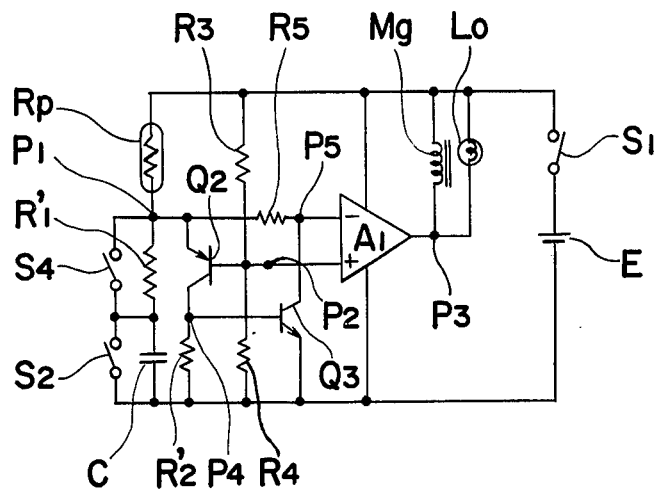
FIG. 4 is a similar diagram to FIG. 3, but particularly shows a modification thereof.

Referring to FIG. 4, there is shown a modification of the exposure indicating device of FIG. 3. In this modification, blur occurring shutter speed range and the shutter speed which is out of the camera capacity are to be indicated by a single indicating lamp L0 in place of the indicating lamps L1 and L2 in FIG. 3. A resistor R5 is further inserted between the point P1 of the light measuring circuit and the one input terminal of the differential amplifier A1, while the connection of the collector of the transistor Q3 to the positive side of the power source E through the indication lamp L2 described as effected in the circuit of FIG. 3 is replaced by the connection of the same collector of the transistor Q3 to the junction P5 between the resistor R5 and the input terminal of the amplifier A1.

In the arrangement of FIG. 4, at the blur occurring shutter speed range, both of the transistors Q2 and Q3 are turned off, so that the function of the circuit is the same as that in the arrangement of FIG. 3, with the lamp L0 being lit for indicating the blur occurring shutter speed. When the brightness of the object to be photographed is over the range effecting blur occurring shutter speed, the transistor Q2 is not turned on yet, and consequently the lamp L0 remains de-energized. Over the available highest shutter speed range, the transistor Q2 is rendered conducting, with current flowing through the collector of the transistor Q3 from the point P1 through the resistor R5. The resultant voltage drop across the resistor R5 causes the input terminal voltage of the amplifier A1 to fall lower than the voltage at the point P1, and to fall lower than the reference voltage of the point P2, which corresponds to the potential at P2 in FIG. 3, thus an output is produced from the amplifier A1 to energize the lamp L0 again for indicating such higher outside shutter speed. By this arrangement, excess of the shutter speeds both beyond the upper and the lower limits of the available shutter speed for optimum exposure can be indicated by the same lamp L0.

Figure 5:
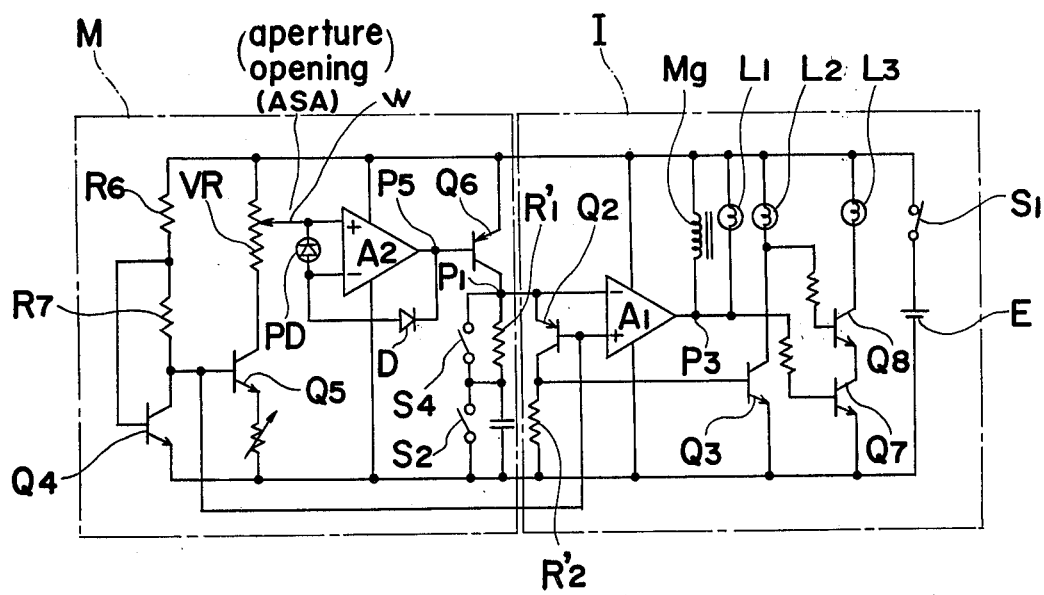
FIG. 5 is a schematic electrical diagram showing arrangement of an exposure indicating device according to a second embodiment of the present invention.

Referring now to FIG. 5, there is shown a second embodiment of the exposure indicating device of the invention, which generally comprises a light measuring circuit M and an indicating circuit I each surrounded by a chain line in FIG. 5. In the light measuring circuit M, the photosensitive element Rp described as employed in the circuit of FIG. 3 is replaced an anti-logarithmic conversion transistor Q6 which is driven by an output from a photoelectric circuit including a photodiode PD, an operational amplifier A2 and a logarithmic conversion element D, e.g. diode for generating at the point P1 a voltage proportional to logarithm of light intensity incident on the photodiode. The emitter of the transistor Q6 is connected to the positive side of the power source E, while the collector of the same transistor Q6 is connected to the resistor R1' at point P1. The base of the transistor Q6 is connected to the output terminal of the amplifier A2. The junction amplifier A1 of the indicating circuit I. The junction P5 between the base of the transistor Q6 and the output terminal of the amplifier A2 is connected to one input terminal of the same amplifier A2 through the logarithmic conversion element D. The other input terminal of the amplifier A2 is connected to a slider $w$ of a potentiometer VR which is connected between the positive side of the power source E and the collector of a transistor Q5, with a photodiode PD being connected between said one input terminal of the amplifier A2 and the slider $w$. This slider $w$ is moved in accordance with film sensitivity and/or aperture setting so that the potential at the point P5 includes the information of such settings. The emitter of the transistor Q5 is connected to the negative side of the power source E through a suitable variable resistor, while the base of the transistor Q5 is further connected to the collector of a transistor Q4, which collector is connected to series-connected resistors R6 and R7 inserted in series with respect to the power source E. The emitter of the transistor Q4 is coupled to the negative side of the power source E, while the base thereof is connected to a junction between the resistors R6 and R7, thus a constant voltage circuit being formed by the transistor Q4, and the resistors R6 and R7 for supplying constant voltage to the base of the transistor Q5 for flowing a constant current through the potentiometer VR, while the same constant voltage is also impressed to the amplifier A1 of the indicating circuit I as an operating standard voltage. Although the indicating circuit I is fundamentally similar to that of FIG. 3, another lamp L3 which is in series with transistors Q8 and Q7 is further included for exclusive indication of the available shutter speed range for optimum exposure. The collector of the transistor Q8 is connected to the lamp L3 which is further connected to the positive side of the power source E, with the base of the same transistor Q8 being connected to a junction between the collector of the transistor Q3 and the lamp L2 through a suitable resistor, while the emitter of the transistor Q8 is connected to the collector of the transistor Q7 whose base is connected to the output terminal of the amplifier A1 also through a suitable resistor. The emitter of the transistor Q7 is connected to the negative side of the power source E. Since the transistors Q7 and Q8 are each turned off while the lamps L1 and L2 are lit, and are rendered conducting while the same lamps L1 and L2 are de-energized, the lamp L3 is lit in the available shutter speed range. In the above arrangement, since the slider $w$ of the potentiometer VR is associated with settings of the film sensitivity and degree of the of the diaphragm aperture opening, such information is added to the logarithmic conversion value of the brightness of the object to be photographed the resultant value of which is then impressed to the base of the transistor Q6. The brightness of the object to be photographed, the degree of diaphragm aperture setting and the film sensitivity are combined for indicating the blur occurring shutter speed range, the available shutter speed range and the higher outside shutter speed range.

Referring back to the circuit diagram of FIG. 3 wherein the resistors $R'1$ and $R'2$ and the transistor Q2 are connected in parallel with each other for controlling the transistor Q3 through the resistor $R'2$, the significance and advantage of providing the circuit including the transistor Q2 and the resistor $R'2$ are described hereinbelow. Although it is theoretically possible to detect the scene brightness in the blur occurring range and that in the higher outside range from the voltage signal at the junction P1 of the series-connected photoelectric element Rp and the resistor $R'1$, there exists a certain problem encountered in actual practice as referred to below. Namely, while the voltage level at the junction P1 of the photoelectric element Rp and the resistor $R'1$ varies according to the variation of resistance value of the element Rp, the variation rate of the voltage level at the junction P1 with respect to the resistance variation of the photoelectric element Rp is small, when the voltage level at the junction P1 is either close to the level of the negative terminal of the power source or near the level of the positive terminal of the same, and thus the voltage levels at the junction P1 corresponding to the blur occurring range and the higher outside range are to be located at a point whereat the above variation rate is small. The variation rate of the junction P1 is large at the point where the level of the junction P1 is equal to half of the power source voltage E. If the level at the junction P1 corresponding to the blur occurring range is set to be at a point equal to half of the power source voltage E, the level at the same junction P1 corresponding to the higher outside range is undesirably located in the region wherein the variation rate is extremely small, thus making it difficult to effect correct detection. Meanwhile, in the circuit of FIG. 5, electric current proportional to the scene brightness is caused to flow in the resistor $R'1$, and if said electric current should be increased to several times the current that flows at the blur occurring range, the transistor Q6 is inevitably saturated, thus not being able to produce any significant signal. The above described inconveniences can advantageously be solved by the provision of the circuit including the transistor Q2 and the resistor $R'2$. By the presence of the above circuit, not only the increase of the voltage level at the junction P1 is suppressed, but the voltage signal to be newly produced across the resistor $R'2$ makes it possible to detect the higher outside range with accuracy, with the adjustments for the detection being readily effected by the employment of the resistor $R'2$ having suitable resistance value.

It should be noted here that in the foregoing embodiments, although the blur occurring shutter speed and the higher outside shutter speed are employed for setting the upper and lower shutter speed range of exposure, any shutter speed ranges other than these may be selected to define the upper and lower ranges of shutter speeds, depending on the requirements.

It should also be noted that in the foregoing embodiments, although shutter speed ranges are adapted to be indicated with respect to automatic control of shutter, the device may be so arranged as to indicate how the aperture value corresponding to the light measuring value is related to upper and lower limits of aperture opening which can be effected by a camera wherein aperture diaphragm is controlled by the electromagnet, in which case, for example, the capacitor C described as employed in the embodiment of FIG. 3 may be replaced by a variable resistor for aperture control.

It is needless to say that the photoelectric element and the resistor described as constituting the light measuring circuit in the foregoing embodiments may be replaced by a solar cell or a combination of a photoelectric element and a diode, and that the indicating lamps described as employed in the foregoing embodiments may be electrical lamps, tungsten filament lamps, light emitting diodes, and the like so far as these meet the purpose of clear and definite indications.

As is clear from the foregoing description, since no change-over switches or the like associated with the depression of the shutter release button are employed in the exposure indicating device of the invention, the construction of the device is very simple, with small stroke being required for the depression of the shutter release button, thus being particularly advantageous for incorporation into compact sized cameras.

Figure 1:
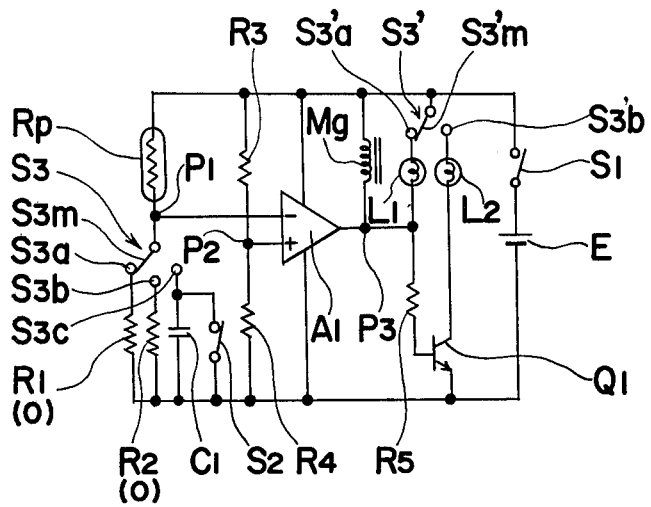
FIGS. 1 and 2 are schematic electrical diagrams explanatory of conventional arrangements of exposure indicating devices which have already been referred to, FIG. 3 is a schematic electrical diagram showing arrangement of an exposure indicating device according to one embodiment of the present invention.
Figure 2:
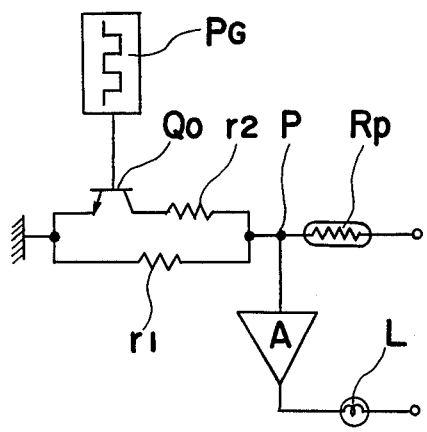

Furthermore, in the device of the present invention, the checks for the blur occurring shutter speed and the higher outside shutter speed can be made simultaneously by the mere depression of the shutter release button, so that the disadvantages in the conventional arrangement as described with reference to FIG. 1, in which some skill is required in depressing the shutter release button for checking the shutter speeds are advantageously eliminated.

Although the present invention has been fully described by way of example with reference to the attached drawings, it is to be noted that various changes and modifications are apparent to those skilled in the art. For example, the shutter speeds described as set in the foregoing embodiment may be replaced by the ranges of scene brightness. Therefore, unless such changes and modifications depart from the scope of the present invention, they should be construed as included therein.

What is claimed is:

1. In a photographic camera including an automatic exposure control device having a photoelectric means for generating an output representative of the scene brightness, exposure control means connected to said photoelectric means for generating an exposure control voltage in accordance with the output of said photoelectric means, reference voltage means for generation of a reference voltage, a comparison means, having a first input terminal connectable to said exposure control means and a second terminal connected to said reference voltage means for generating an output when said exposure control voltage reaches said reference voltage, electromechanical means connected to said comparison means for control of film exposure in response to the output of said comparison means, and an exposure indicating means for indicating by actuation and deactuation of at least one indicator element what relation the exposure to be determined automatically will have with respect to a plurality of standards, an improved exposure indicating device comprising:

a light-representative means connected to said photoelectric means and connectable to said first input terminal of said comparison means for generating a light-representative voltage in accordance with the output of said photoelectric means and for causing said comparison means to generate an output when said light-representative voltage differs from the reference voltage in one predetermined direction;

a first transistor connected with its base and emitter between outputs of said light-representative means and said reference voltage means for generating an output when said light-representative voltage differs from said reference voltage by more than a predetermined amount in the opposite direction to said one predetermined direction; and said exposure indicating means being connected to said comparison means and said first transistor for actuation of said at least one indicator element when said comparison means generates an output and for actuation of said at least one indicator element when said first transistor generates an output.

2. An exposure indicating device as claimed in claim 1 wherein said exposure indicating means includes a resistor connected to the collector of said transistor to generate a voltage thereacross commensurate with the output current of the transistor, said resistor and said transistor being connected in parallel with said means for generating a light-representative voltage, and further includes a second transistor responsive to the voltage across the resistor.

3. An exposure indicating device as claimed in claim 2, in which voltage light-representative a connecting resistor connects said light-representative means with said first input terminal of said comparison means;

said second transistor has a collector connected to said first input terminal of said comparison means, for causing the voltage on said first input terminal of said comparison means to differ from the reference voltage in one predetermined direction when said secnd transistor is conducting, whereby the voltage on said first input terminal of said comparison means differs from the reference voltage in one predetermined direction when said light-representative voltage differs from said reference voltage by more than a predetermined amount in the opposite direction to said one predetermined direction; and said exposure indicating means is connected directly to said comparison means and is connected indirectly to said first transistor through said comparison means.

4. An exposure indicating device as claimed in claim 2 wherein said exposure indicating means further includes a first indicator element connected to said comparison means and responsive to the output of said comparison means, and a second indicator element connected with the collector of said second transistor and responsive to the current through said collector of said second transistor.

5. An exposure indicating device as claimed in claim 4 in which said exposure indicating means further includes:

a NOR circuit connected to said first and second indicator elements for producing an output when both of said first and second indicators are deactivated; and a third indicator element connected to said NOR circuit for generating an indicator signal when said NOR circuit generates an output.

6. An exposure indicating device as claimed in claim 4, in which said photoelectric means comprises:

a photodiode;

an amplifier means having a first input terminal connected to one terminal of said photodiode and a second input terminal connected to the other terminal of said photodiode, for amplifying the voltage across said photodiode; and a logarithmic compression means connected to said amplifier means for providing amplifier gain proportional to the logarithm of the difference in voltage between said first and second input terminals.

7. An exposure indicating device as claimed in claim 6 wherein said photoelectric means further includes:

control means connected to said amplifier means for adjusting the output of said amplifier means by a manually preset light unrelated exposure factor.

8. An exposure indicating device as claimed in claim 1, wherein:

said exposure control means includes an integrating capacitor connected to the output of said photoelectric means;

said electromechanical means being means for controlling the length of exposure; and said exposure indicating means indicating the length of exposure determined by said electromechanical means is in the blur occurring range, the available range or the high outside range.

9. A photographic camera as claimed in claim 8 wherein said exposure indicating means includes a first indicator element connected to said comparison means and responsive to the output of said comparison means and a second indicator element connected to collector of said second transistor responsive to the current through said collector of said second transistor.

10. An improvement in an exposure indicating device according to claim 7, in which:

said indicator means comprises a first indicator connected to said first comparison means and responsive to the output of said first comparison means and a second indicator connected to said second comparison means and responsive to the output of said second comparison means.

11. An exposure indicating device as claimed in claim 1, in which:
said photoelectric means comprises a photoelectric element;
said light-representative means is connected in series with said photoelectric element for generation of said light-representative voltage; and
said exposure control means is connected in series with aid photoelectric element to form a time constant circuit for generation of said exposure control voltage.

12. An exposure indicating device as claimed in claim 11, further comprising:
a shutter control means for starting film exposure sequence; and
a selection means having a first switch means connected in parallel with said light-representative means and a second switch means in parallel with said exposure control means, both of said first and second switch means being alternatively opened and closed in response to said shutter control means, whereby said first switch means is open and said second switch means is closed when said shutter control means is deactivated and said first switch means is closed and said second switch means is open when said shutter control means is activated.

13. An improvement in an exposure indicating device according to claim 11, in which:
said selection means comprises a first switch connected in parallel with said light-representative means and a second switch connected in parallel with said exposure control means, both of said first and second switches being alternatively opened and closed in response to said shutter control means, whereby said first switch is open and said second switch is closed when said shutter control means is deactivated and said first switch is closed and said second switch is open when said shutter control means is activated.

14. An exposure indicating device as claimed in claim 1, wherein said reference voltage means includes a plurality of resistors connected in series to form a voltage divider for generating said reference voltage.

15. An exposure indicating device as claimed in claim 1, wherein said reference voltage means includes a constant voltage source.

16. An exposure indicating device as claimed in claim 1, wherein said comparison means includes a differential amplifier.

17. An improvement in an exposure indicating device for automatic exposure control photographic cameras comprising:
photoelectric means for generating an output representative of the scene brightness;
exposure control means for generating exposure control voltage when connected with said photoelectric means;
light-representative means for generating light-representative voltage when connected with said photoelectric means;
shutter control means for starting film exposure sequence;
selector means interconnected with said shutter control means, said photoelectric means, said exposure control means and said light-representative means, for alternatively connecting said exposure control means and said light-representative means to said photoelectric means in response to said shutter control means, whereby said exposure control means is connected to said photoelectric means when said shutter control means is activated and said light representative means is connected to said photoelectric means when said shutter control means is deactivated;
reference voltage means for generating a reference voltage;
first comparison means with a first input connected to said light-representative means and said exposure control means and a second input connected to said reference voltage means for generating an output when the voltage at said first input is less than the voltage on said second input, whereby when said shutter control is activated said first comparison means produces an output when said exposure control voltage is less than said reference voltage and when said shutter control is deactivated said first comparison means produces an output when said light-representative voltage is less than said reference voltage;
electromechanical means connected to said first comparison means and said shutter control means, for control of film exposure when said shutter control means is activated and said first comparison means generates an output;
second comparison means with a first input connected to said light-representative means and said exposure control means and a second input connected to said reference voltage, for generating an output when the voltage on said first input exceeds the voltage on the second input by more than a predetermined amount, whereby when said shutter control means is deactivated said second comparison means generates an output when said light-representative voltage exceeds said reference voltage by more than said predetermined amount; and
indicator means connected to said first and second comparison means for generating an indicator signal when said first comparison means generates an output and for generating an indicator signal when said second comparison means generates an output.

18. An improvement in exposure indicating devices according to claim 17, in which:
said second comparison means comprises a first transistor the emitter of which is the first input of said second comparison means and the base of which is the second input of said second comparison means;
a second comparison resistor connected to the collector of said first transistor; and
a second transistor having the base connected to the collector of said first transistor and one terminal of said resistor and the emitter connected to the other terminal of said resistor, for generating the output of said second comparison means.

19. An improvement in an exposure indicating device according to claim 18, in which:
a said connection between said light-representative means and said first input of said first comparison means is a connecting resistor.
said second transistor has its collector connected to said first input of said first comparison means, for causing the voltage on said first input of said first comparison means to be less than said reference voltage when said second transistor is conducting, whereby the voltage on said first input of said first comparison means is less than said reference voltage when the voltage on said first input of said second comparison means exceeds said reference voltage by more than said predetermined amount; and said indicator means is connected directly to said first comparison means and is connected indirectly to said second comparison means through said first comparison means.

20. An improvement in an exposure indicating device according to claim 18, in which:

said indicating means includes a first indicator connected to said first comparison means responsive to the output of said first comparison means and second indicator connected to the collector of said second transistor responsive to the current through said collector of said second transistor.

21. An improvement in an exposure indicating device according to claim 20, in which:

said indicating means includes a NOR circuit connected to said first and second indicators for providing an output when both of said first and second indicators are deactivated; and a third indicator connected to said NOR circuit responsive to said NOR circuit for generating and indicator signal when both of said first and second indicators are deactivated.

22. An improvement in an exposure indicating device according to claim 20, in which:

said photoelectric means comprises a photodiode;

an amplifier means having first input terminal connected to one terminal of said photodiode and a second input terminal connected to the other terminal of said photodiode, at least one of said input terminals being an inverting input terminal, for amplifying the voltage across said photodiode; and a logarithmic compression means connected between the output of said amplifying means and said at least one inverting input of said amplifier means, for providing amplifier gain proportional to the logarithm of the difference in voltage between said first and second inputs.

* * * * *